United States Patent

[11] 3,545,579

| [72] | Inventor | James M. Kostas |
| | | Peoria, Illinois |
| [21] | Appl. No. | 776,740 |
| [22] | Filed | Nov. 18, 1968 |
| [45] | Patented | Dec. 8, 1970 |
| [73] | Assignee | Caterpillar Tractor Co. |
| | | Peoria, Illinois |
| | | a corporation of California |

[54] HYDRAULIC MOTOR WITH COUPLING CONTROL VALVE
7 Claims, 4 Drawing Figs.

[52] U.S. Cl............................................. 192/3,
    74/843, 91/412, 192/.03, 192/.073, 192/.096
[51] Int. Cl........................................... F16d 47/00
[50] Field of Search............................. 192/.03,
    .07, .075, .096, 3, .073; 74/843; 91/412(Cursory)

[56] References Cited
UNITED STATES PATENTS

| 2,502,234 | 3/1950 | Rosen............ | 192/.07 |
| 2,520,115 | 8/1950 | Cahill et al........ | 192/.096 |
| 3,209,871 | 10/1965 | Moericke.......... | 192/.096 |

*Primary Examiner*—Benjamin W. Wyche
*Attorney*—Fryer, Tjensvold, Feix, Phillips & Lempio ABSTRACT: A valve for a hydraulic wheel assist motor which is mounted on the motor. A valve spool in the valve is actuated by the hydraulic pressure which drives the motor and a portion of that fluid is delivered, at a reduced pressure, through the valve to actuate a brake in the assist gear train. A manifold may be situated between the hydraulic motor housing and the valve so that the valve may be offset relative to the fluid passages in the hydraulic motor housing and so as to clear retaining bolts and other protuberances on the housing.

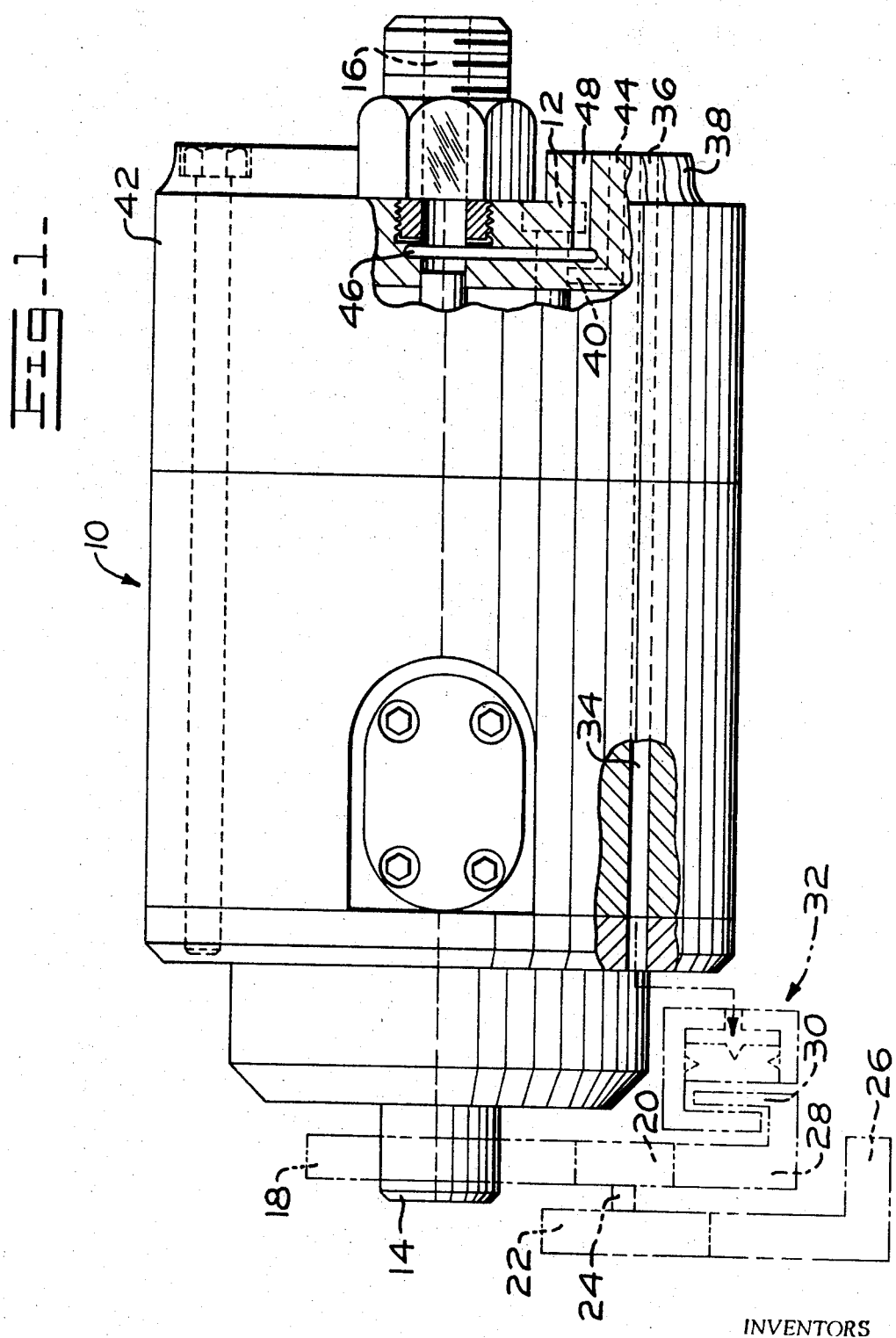

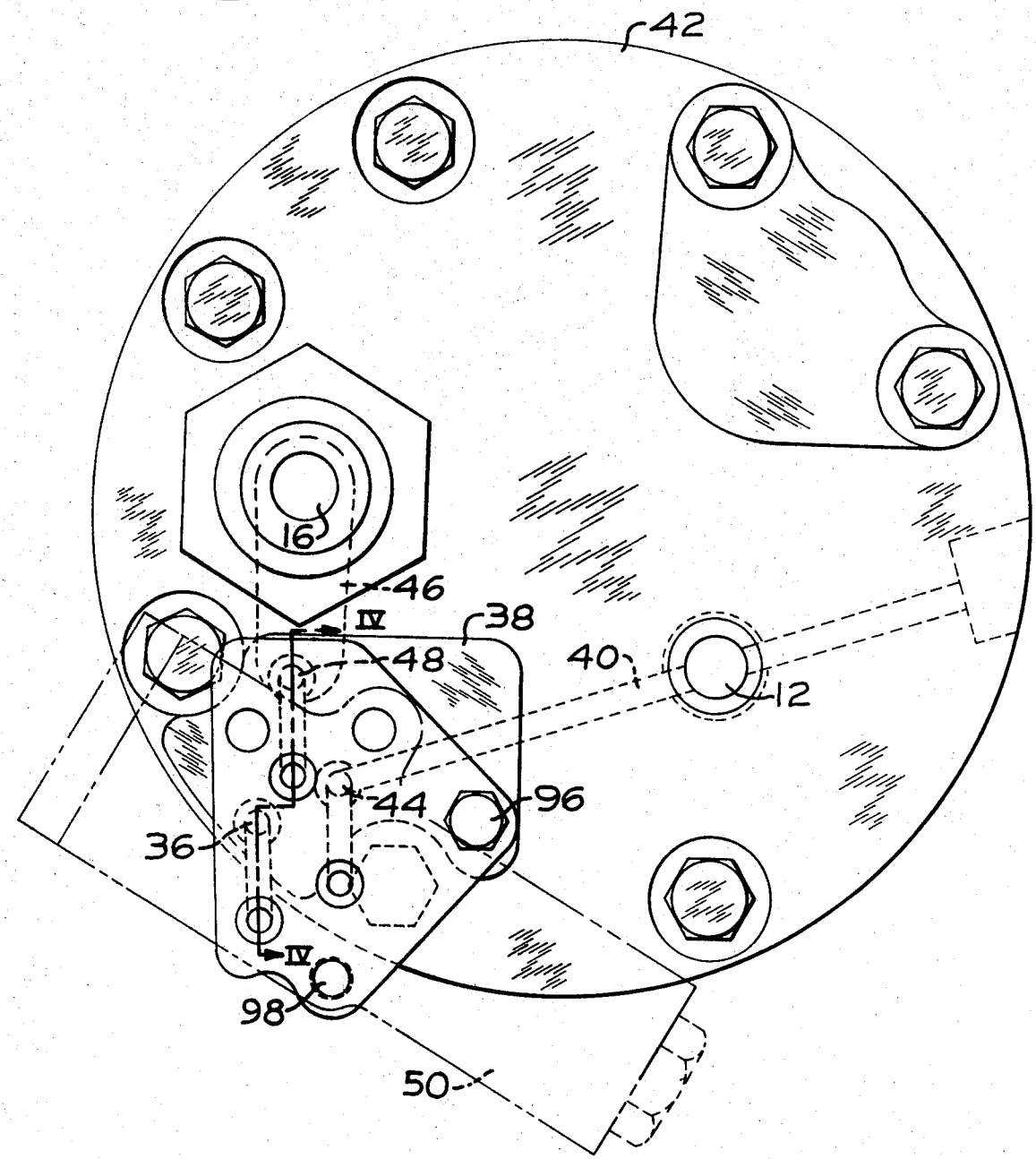

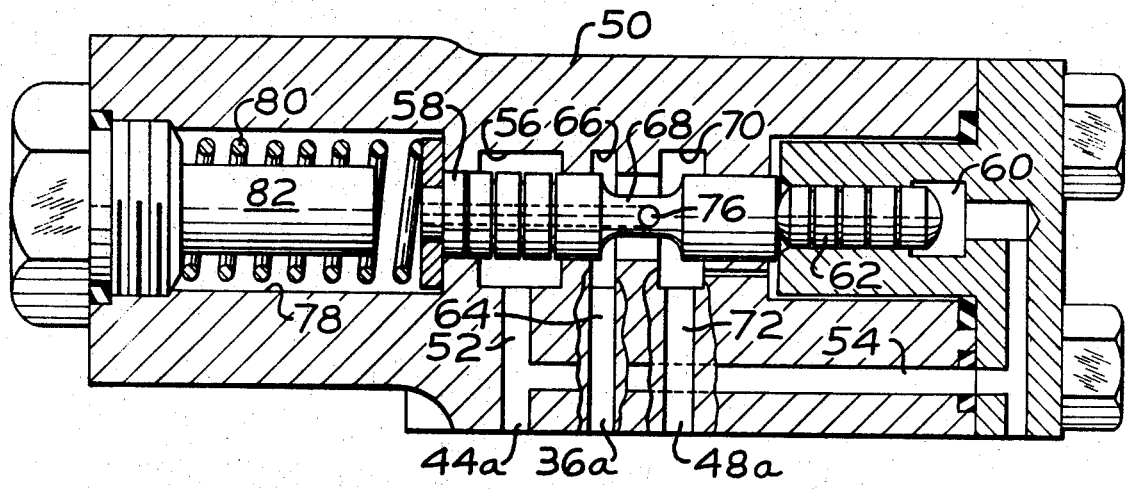
Fig-3-
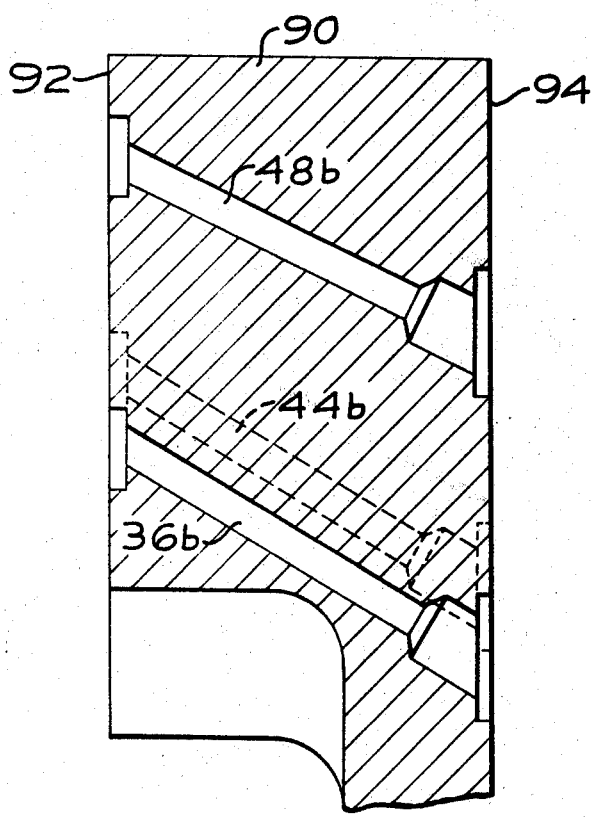
Fig-4-
INVENTORS
JAMES M. KOSTAS
ATTORNEYS

HYDRAULIC MOTOR WITH COUPLING CONTROL VALVE

SUMMARY OF THE INVENTION

The present invention relates generally to a drive assembly for providing driving power, through a gear arrangement, to a rotatable member. The utility of the invention is best seen with reference to its use for providing hydraulic power to the normally nondriven, steerable wheels of an off-highway truck.

Such trucks are operable over wide speed ranges and often encounter adverse conditions in which additional traction is desirable and they are commonly limited to low-speed operation under such conditions. Under normal operating conditions, it is desirable to operate the vehicle over its entire speed range, employing only the vehicle engine, or usual motor means, to provide driving power. Therefore, it is desirable to provide such trucks with auxiliary power assemblies for selectively providing driving power to the normally nondriven dirigible wheels of the vehicle.

Such a drive assembly has been shown in the Pat. application, Ser. No. 670,300, filed Sept. 25, 1967, now U.S. Pat. No. 3,447,547 of Kress et al., and assigned to the assignee hereof.

More particularly, this invention relates to a brake control valve for an intermittently operable hydraulic motor, such as disclosed in the Kress et al. application, which provides all necessary brake functions automatically in response to changing fluid pressure applied to the motor. In greater detail, there is described herein a valve for engaging and disengaging a brake to cause such a hydraulic motor to intermittently provide driving power to a vehicle wheel wherein the valve is arranged integrally with the motor to operate only from system pressure, while requiring no external plumbing.

In many applications of the Kress et al. and similar motors, one centrally located pump which takes fluid from a single reservoir supplies oil to a plurality of wheel motors. Each motor is equipped with a planetary reduction gear system and since the motors are intermittently powered, dependent upon the need for additional traction, a brake and control valve are required for each motor. When the assist drive system is active, inlet pressure to the motor is relatively high, e.g., 3,600—4,000 p.s.i., and when the drive is disengaged, inlet pressure is reduced to approximately 250 p.s.i. These pressures are controlled by a primary control system and the brake control valve must function to engage and disengage the brake at the proper time and to the proper amount required by the varying pressures from the primary control.

In addition, many of the brakes used in such systems embody physical conditions such that the pressure in the brake must be limited to some figure which is lower than the pressure used to drive the motor. For example, when the pressure in the motor is 4,000 p.s.i., it is likely that the maximum allowable in the brake is 2,000 p.s.i. Thus, it is necessary to provide such a valve wherein the brake pressure is limited to a maximum of 2,000 p.s.i. while system pressure varies from a low of 250 p.s.i. to a maximum of 4,000 p.s.i.

In many vehicles utilizing such hydraulic motors, the wheel upon which the motor is mounted moves a foot or more in a vertical plane, while being oscillatable as much as 45° or more in a horizontal plane. Thus, a critical design problem arises in properly locating the brake control valve. Location of the valve on the vehicle frame requires a number of long, flexible high pressure lines, which is impractical since such lines at that position of the vehicle are subject to a high failure rate. It has also been proven that it is impractical to mount the valve on the motor, using short rigid conduit between the valve, motor, and brake because these small lines are also highly vulnerable to failure from collision with rocks and other objects due to their exposed location.

Thus, it has been determined that the most practical answer to the problem noted above, is to mount the valve in an integral arrangement with the hydraulic motor so as to obviate the problem of plumbing extending therebetween, and, if necessary, to place a manifold between the valve and motor so as to offset the valve form from obstructions on the motor housing.

It is therefore an object of this invention to provide a brake control valve for an intermittently operable hydraulic motor.

It is also an object of this invention to provide such a valve which provides all necessary brake functions automatically in response to changing fluid pressures applied to the motor.

It is also an object of this invention to provide such a valve wherein the pressure delivered to the brake may be at a lesser pressure than that delivered to the hydraulic motor.

It is a further object of this invention to provide a brake control valve which is integral with a hydraulic motor which is mounted on the axle of a vehicle.

It is also an object of this invention to provide such a valve wherein only a minimum of external lines from a centralized pressure source are required.

It is a further object of this invention to provide such a valve wherein the valve is actuated by the same fluid which drives the hydraulic motor.

It is a still further object of this invention to provide such a valve wherein only supply and return lines for the hydraulic motor are required between the vehicle and wheel.

Other objects and advantages of the present invention will become apparent from the following description and claims as illustrated in the accompanying drawings which, by way of illustration, show a preferred embodiment of the present invention and principles thereof and what is now considered to be the best mode contemplated for applying these principles. It is recognized that other embodiments of the invention utilizing the same or equivalent principles may be used, use, and structural changes may be made as desired by those skilled in the art, without departing from the present invention and purview of the appended claims.

BRIEF DESCRIPTION OF THE DRAWINGS

FIG. 1 is an elevation, partly in section, of the motor utilized with the present invention, together with a schematic illustration of the drive system associated therewith;

FIG. 2 is an end view of the motor shown in FIG. 1 with the manifold attached to the motor and the valve illustrated in relation thereto;

FIG. 3 is a sectional, elevation view of the instant invention; and

FIG. 4 is a sectional view of the manifold, taken along a line IV—IV of FIG. 2.

DETAILED DESCRIPTION

Referring now to the drawings in greater detail, there is shown in FIG. 1 a hydraulic motor 10, which is utilized to provide a power assist to a normally nondriven wheel which may or may not be dirigible. Pressurized fluid, from a centralized source (not shown), enters the motor via inlet port 12 and fluid leaving the motor exits via return port 16.

As the motor turns, a sun gear 18, suitably attached to an output shaft 14, drives a planetary gear arrangement, schematically illustrated in FIG. 1 as a single planet cluster represented by gears 20 and 22, connected by a shaft 24.

Gear 22 is in mesh with a ring gear 26 which is rigidly mounted to the wheel hub (not shown). In the absence of any other components, the motor, when powered, would merely move the planetary arrangement about the inside of the ring gear 26. To make the drive effective, a second ring gear 28 is provided in mesh with the planet gear 20. A brake plate 30 is fixed to the ring gear 28 and can be gripped by a brake assembly 32 to ground the ring gear 28 and thus provide driving power to the ring gear 26.

Hydraulic fluid is delivered to, and exits from, the brake 32 by means of a brake fluid passage 34 in the motor housing which extends to a port 36 in a boss 38 on the opposite end of the housing.

An inlet fluid passage 40, in the end housing 42 of the motor, communicates fluid between the inlet port 12 and a port 44 in the boss 38. A fluid outlet passage 46, in the end housing 42, communicates the outlet or return port 16 with a drain port 48 in the boss. The fluid entering and leaving ports 36, 44, and 48 passes through a brake control valve, to be described later, so that fluid entering the main inlet port 12 passes through passage 40, port 44, the valve port 36, passage 34, and then to the brake 32. As will be explained later, this occurs only when the fluid pressure reaches a predetermined value. When the pressure in the main port 12 decreases below a predetermined value, the fluid returns from the brake 32, through the valve, to the outlet port 48 and passage 46, and then to the main return port 16.

Turning now to FIG. 3, there is shown a brake control valve 50 having ports 44a, 36a, and 48a. As described previously, hydraulic fluid entering the main inlet port 12 in the motor 10 enters the supply passage 40 and passes to the port 44 in the boss 38. This fluid is delivered to the port 44a of the valve 50 wherein it enters passages 52 and 54.

The fluid in passage 52 enters an annulus 56 which surrounds a valve spool 58. The fluid in passage 54 is directed to a compartment 60 in which is situated a piston 62.

In the position of the valve spool shown in FIG. 3, any fluid in the brake 32 will exhaust from the brake via passage 34 in the motor, brake port 36 in the boss, and then through port 36a which directs the fluid through a passage 64 in the valve to an annulus 66. As the fluid enters the annulus 66, it passes along an annular groove 68 on the valve spool to another annulus 70 through which it is delivered to a passage 72 and the port 48a in the valve. The fluid leaving port 48a is then delivered to port 48 in the motor and is transferred to the main outlet port 16 for return to the central reservoir.

An axial passage 76 in the valve spool opens within the annular groove 68 to communicate that groove with an end compartment 78 in the valve body which contains a spring 80 which serves to bias the valve spool 58 to the position shown in FIG. 3.

When the pressure of the fluid entering main inlet port 12 is 250 p.s.i., the spring 80 will sufficiently offset the hydraulic force in compartment 60, thereby maintaining the valve spool in the position shown. Thus, at this pressure, the brake 32 is inactive and any power delivered to the gear 18 is merely dissipated in the rotation of the planet cluster formed by gears 20 and 22.

As the pressure in the main inlet port begins to rise in response to a signal from the main control point in the vehicle, the brake starts to actuate when the system pressure reaches 275 p.s.i. This 25 p.s.i. increase in chamber 60 overcomes the force of spring 80 sufficiently to move the spool 58 leftwardly, closing off communication between annuli 70 and 66, and creating a slight opening between the annuli 56 and 66. Thus, fluid entering port 44a will pass the valve spool and exit via port 36a for delivery to the brake. Further, the fluid entering passage 44a will enter the cavity 78 via passage 52 and axial passage 76 so that the spool is biased at its left end by both the spring 80 and the existing brake pressure.

As the input pressure builds up, the pressure in compartment 60 will act against piston 62 to move the valve spool 58 further to the left, reaching a position of maximum movement when the valve spool abuts a cylindrical stop 82 within the compartment 78, which prevents a possible overshoot of the spool in the event of system pressure surges. Without this positive means of limiting spool movement, such pressure surges could cause the spool to momentarily move too far and thus permit excessive fluid pressure to be transmitted to the brake, thereby possibly damaging it.

In many systems wherein the valve is to function, brake fluid pressure capacity is less than that of the motor. This is compensated for by allowing the valve spool to reduce the pressure of that fluid passing to the brake.

With a maximum motor pressure, for example, of 4,000 p.s.i., the brake may require only 2,000 p.s.i. This is accomplished by directing system oil pressure through the passage 54 to the cavity 60 to act on the piston 62. The ratio of the area of the piston where system pressure is effective, to the area of the spool which is acted upon by the fluid pressure in compartment 78, plus the force of spring 80, allows a spool biasing ratio of any predetermined ratio—in this example, 2 to 1. Thus, with 4,000 p.s.i. in chamber 56 (and supplied to the hydraulic motor), spool 58 will move leftwardly sufficiently to meter oil at 2,000 p.s.i. to the brake.

In many applications, it is impossible to mount the valve directly to the boss 38 due to obstructions on the end casing 42 as well as possible interference with the inlet and outlet ports. Thus, if necessary, the valve may be offset, relative to the boss, as well as moved outwardly from the end casing. This can be accomplished by means of a suitable manifold 90 such as shown in FIG. 4. Such a manifold is provided with a face 92 for abutment with the boss 38 and a face 94 for abutment with the valve 50.

Suitable passages 36b, 44b, and 48b extend through the manifold 90 at predetermined angles relative to the faces 92 and 94, so as to interconnect the ports 36–36a, 44–44a and 48–48a respectively. If desired, annular recesses may be provided at the terminal ends of the angled passages, as shown, to provide sealing between the manifold and the motor and between the manifold and the control valve through the employment of conventional O-rings. Of course, such recesses could also be provided in the valve and/or the boss.

As shown in FIG. 2, the manifold may be mounted to the boss by means such as bolts 96 and the valve may be connected to the manifold by the use of either the same bolts or by other bolts extending through the valve into threaded apertures 98 in the manifold.

Thus, the applicant has provided a hydraulic wheel assist motor brake control valve which is capable of relatively inexpensive production while reducing the number of hydraulic hoses which must extend from a vehicle frame to the assist motor. While illustrated and described as a single preferred embodiment together with some possible alterations, the invention is capable of variation and modification within the purview of the following claims in many ways which will be obvious to those skilled in the art.

I claim:

1. In a vehicle wheel hydraulic assist system:
   a brake actuation control means comprising a hydraulic assist motor having a housing with a main fluid inlet and a main fluid outlet and a valve mounted on said housing of said hydraulic assist motor;
   first passage means in said housing for transferring fluid from said main fluid inlet to said valve and from said valve to said main fluid outlet;
   second passage means in said housing adapted to transfer fluid to and from said valve, thereby energizing and deenergizing a brake;
   a fluid metering device comprising a spool within said valve, piston means within said valve for motivating said fluid metering device in proportion to the pressure of the fluid passing said metering device;
   spring means in said valve opposing the motivation of said piston means, thereby predetermining a pressure limit below which said valve is incapable of passing fluid to the brake; and
   third passage means in said spool allowing the passage of fluid whereby said spring means opposing the motivation of said piston means is implemented by fluid pressure in said second passage means and thereby resists motivation of said spool.

2. The invention of claim 1 further including limit means in said valve limiting the maximum motivation of said spool whereby the maximum pressure in said second passage means is predetermined.

3. The invention of claim 1 wherein said first and second passage means include apertures in the surface of said housing, said valve has corresponding apertures in the surface thereof, and further including means for mounting said valve on said housing.

4. The system of claim 3 including a manifold between said valve and said housing and passages in said manifold connecting the apertures on said housing surface to the apertures on said valve surface.

5. In a vehicle wheel hydraulic assist system:
a brake actuation control means comprising a hydraulic assist motor having a housing with a main fluid inlet and a main fluid outlet, a valve mounted on said housing of said hydraulic assist motor;
first passage means in said housing for transferring fluid from said main fluid inlet to said valve and from said valve to said main fluid outlet;
second passage means in said housing adapted to transfer fluid from said valve to an aperture in said housing for communication with a brake;
a fluid metering device comprising a single spool within said valve;
piston means within said valve at one end of said spool for motivating said spool in proportion to the pressure of the fluid passing said spool whereby fluid from said first passage means is metered through said valve to said second passage means at a reduced pressure from the fluid pressure in said first passage means; and
spring means in said valve at the other end of said spool opposing the motivation of said piston means whereby said spool will not be motivated by said piston means until a predetermined minimum value of fluid pressure is achieved in said first passage means such that no fluid flow will occur past said metering device form said first passage to said second passage until said minimum value of fluid pressure is achieved.

6. The invention of claim 5 wherein said spring means comprises a spring and wherein said actuation means comprises a piston.

7. The invention of claim 6 further including limit means in said valve adapted to limit the maximum motivation of said spool.